Sept. 21, 1954   O. J. TERRIERE   2,689,381
METHOD OF MAKING TILE
Filed March 20, 1953
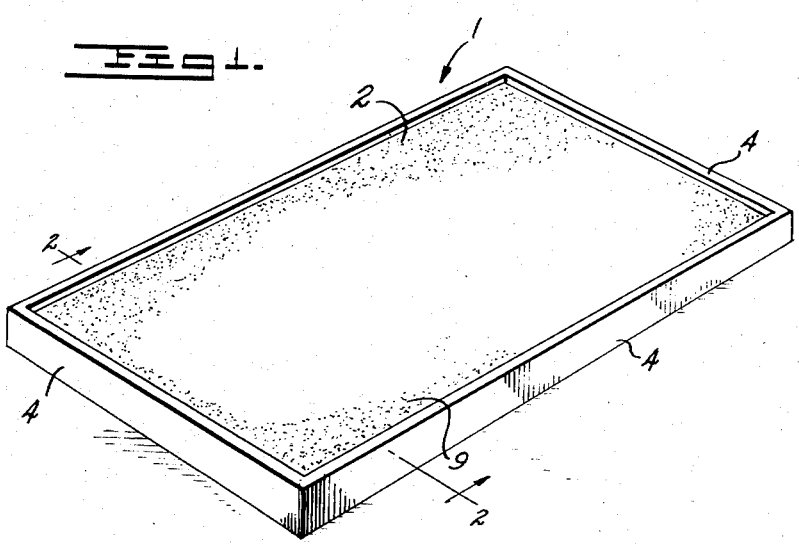
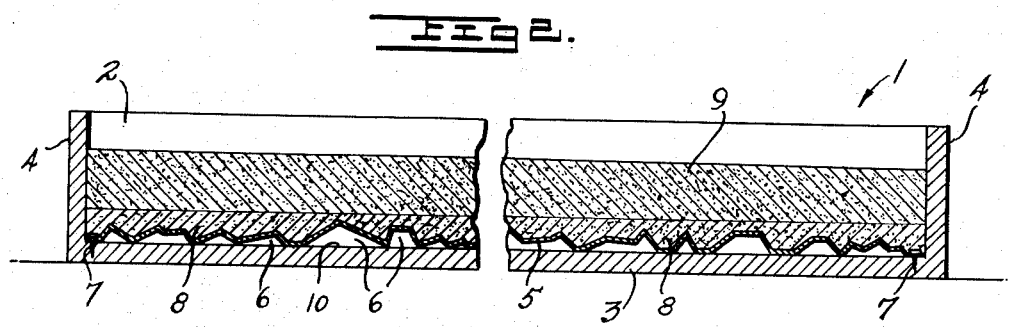
INVENTOR
Oscar J. Terriere
BY Mason, Mason & Sheridan
ATTORNEY Patented Sept. 21, 1954

2,689,381

UNITED STATES PATENT OFFICE 2,689,381

METHOD OF MAKING TILE

Oscar J. Terriere, Rapid City, S. Dak.

Application March 20, 1953, Serial No. 343,696

1 Claim. (Cl. 18—60)

This invention relates to a novel method of making an ornamental tile or siding.

An object of the invention is to provide a method of making a light weight, highly decorative tile or siding which may be cheaply and easily made by means of a mold of special construction.

An additional object of the invention is to employ a method of making a decorative tile or siding to which highly unusual decorative coloring effects have been imparted to the face thereof.

Another object is to provide a method of producing articles of the type described wherein said articles after production may be readily sawed to proper shape and size.

A further object is to provide a method employing a mold having a novel lining which may be shaped to various shapes, which can be used several times and which can be reshaped and used again in the molding operation.

Other objects will appear hereinafter.

Figure 1 is a perspective view of the mold containing the poured tile material; and Figure 2 is a vertical sectional view taken on the line 2—2 of Figure 1.

In the drawings, the numeral 1 represents a conventional mold having an opening 2 for the reception of the material. The mold is composed of metal, wood, or any other suitable material, and is provided with a base 3 and sides 4.

A sheet of metal foil material 5 is placed in the mold so as to entirely cover the bottom of the mold and to form a face shaping matrix. This metal foil sheet is preferably of heavier gage metal than the conventional metal foil so that it will support the several layers of moldable material without becoming flattened or otherwise changing its shape once it has been placed on the bottom supporting surface 10 of the mold.

Before placing the foil sheet material on said surface it is partially crumpled by hand, so that when it is placed in the mold it will form a face shaping matrix that will present a series of irregular shaped raised portions or ridges, and valleys with intervening planar surfaces, some of which are rounded and which are highly irregular and connect the ridges and valleys, the latter of which rest on the surface 10. The underside of the metal foil sheet as it rests on the bottom surface provides a series of air spaces or pockets 6 between the sheet and said surface.

The metal foil sheet is preferably secured to the base by suitable means such as small nails or tacks 7 in the case where the base 3 is of wood.

Assuming the metal foil sheet to be secured in place as shown in Figure 2, the interior of the mold is sprayed by means of a spray gun with a composition consisting of a number of different colored pigments, say as many as four in number, which pigments are separately mixed in the following manner:

Mix one part of the color or colors with ten to twenty parts of waterproofing cement, depending upon the depth of color and the thickness of the layer that is desired. Water is now added in an amount to provide spraying consistency to the composition.

The interior of the mold is sprayed with the composition until the desired color depth is obtained.

The second layer preferably is applied immediately or shortly after the first layer 8 has been sprayed into the mold. The second layer preferably consists of the following materials and proportions of them:

One to one and one-half gallons of perlite is mixed with 100 lbs. of waterproofing cement, and water is added so as to provide a mixture of a consistency that can readily be spread with a trowel.

The first layer is covered by the second layer by means of a trowel to provide a second layer 9 of suitable depth, say to a thickness of one-fourth to one-half of an inch. The composition is allowed to set at suitable temperature such as 40° to 60° F.; although other temperatures, such as room temperature or even a higher temperature, are suitable. After about 24 hours, depending upon conditions of temperature and humidity, the mold may be stripped and the siding or tile is ready for application to the exterior or interior of a building. The tiles of this invention form a very attractive decorative facing for an open fireplace, for instance, and the finished tile may be, for example, one-half to three-fourths of an inch in thickness with the depth of the color in some instances extending throughout the tile thickness.

In place of the first layer the metal foil may be coated with one or more colors by brush painting the upper face of the foil and immediately applying by a trowel the perlite and cement layer before the colored layer has started to dry.

The foil sheet may be used a number of times before it needs to be replaced. This is because the perlite is so much lighter than sand (which has formerly been used) that no substantial deformation or flattening of the metal foil takes place during the molding operation.

The mixing of coloring materials with keen cement and spraying the mixture within the mold and onto the metal foil sheet results in the production of very unusual designs and color effects in siding or tile, the outside surface of which has a hard, glossy white facing with colored areas interspersed therewith.

The use of the keen cement and perlite produces an article that may be sawed to different sizes for use as outside siding and for inside walls and fireplaces.

The above description and drawings disclose a single embodiment of the invention, and specific language has been employed in this specification. It will, nevertheless, be understood that no limitation of the scope of the invention is thereby contemplated and that alterations and modifications may be made such as would occur to one skilled in the art to which this invention relates.

I claim:

The method of making tile and siding in a mold comprising partly crumpling a sheet of metal foil, removably positioning said partially crumpled sheet of metal foil on the mold bottom surface so as to fully cover the bottom of the mold and to provide a plurality of irregularly sized air spaces between said sheet and mold bottom, spraying a watery mixture of one part pigment to ten to twenty parts of white water-proofing cement onto said metal foil sheet in said mold to a depth up to ¼ of an inch, applying a second layer on said first layer, before the latter has become dry, of a troweling consistency mixture of one to one and one-half gallons of perlite to 100 lbs. of water-proofing cement, covering the first mixture to a depth of ¼ to ½ inch with said second layer, permitting the material to dry and stripping the mold, and sawing the resulting product to size.

References Cited in the file of this patent

UNITED STATES PATENTS

| Number | Name | Date |
| --- | --- | --- |
| 1,169,985 | Mickelson | Feb. 1, 1916 |
| 1,211,632 | Shaw et al. | Jan. 9, 1917 |
| 1,412,392 | Earley | Apr. 11, 1922 |
| 1,568,070 | Jennings | Jan. 5, 1926 |
| 1,638,109 | Barnes-Thomas | Aug. 9, 1927 |
| 1,655,725 | Crozier | Jan. 10, 1928 |
| 1,776,999 | Jensen | Sept. 30, 1930 |
| 2,018,192 | Sexton | Oct. 22, 1935 |
| 2,288,559 | Ward | June 30, 1942 |
| 2,467,590 | Johnson | Apr. 19, 1949 |